Jan. 8, 1957 L. M. BERTAUD 2,777,025
DIRECTION INDICATOR SWITCH
Filed Oct. 5, 1953 3 Sheets-Sheet 1
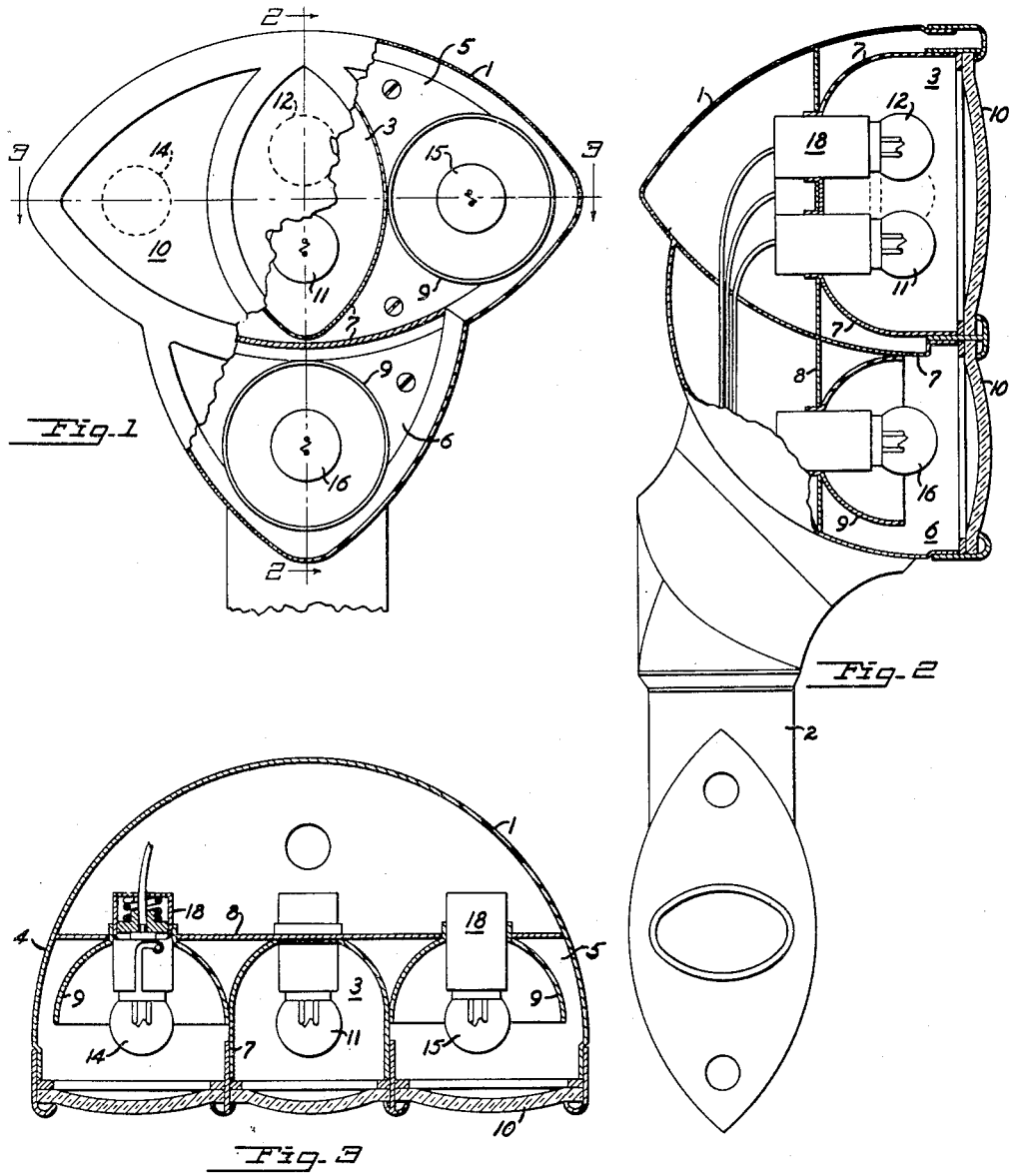
INVENTOR.
LOUIS M. BERTAUD
BY
his ATTORNEY Jan. 8, 1957

L. M. BERTAUD 2,777,025

DIRECTION INDICATOR SWITCH

Filed Oct. 5, 1953

INVENTOR.
LOUIS M. BERTAUD
BY
his ATTORNEY

Jan. 8, 1957 L. M. BERTAUD 2,777,025
DIRECTION INDICATOR SWITCH
Filed Oct. 5, 1953 3 Sheets-Sheet 3

INVENTOR.
LOUIS M. BERTAUD
BY
his ATTORNEY

United States Patent Office 2,777,025
Patented Jan. 8, 1957

2,777,025

DIRECTION INDICATOR SWITCH

Louis M. Bertaud, San Francisco, Calif.

Application October 5, 1953, Serial No. 383,967

5 Claims. (Cl. 200—61.27)

My invention relates to signalling devices for use on motor vehicles for indicating an intended course of action.

It is among the objects of my invention to provide a signalling device for motor vehicles by which an operator may readily and plainly signal an intention to turn or to slow or stop.

Another object is to provide a signalling device in which lights of different colors are energized in various relationships for indicating an intended change in the driver's course of action with a clarity which will minimize the likelihood of confusion and accidents.

Another object is to provide a signalling device for motor vehicles in which running lights normally energized during night driving are automatically de-energized to obviate confusion while a signal is being displayed.

A further object is to provide a control switch by which signal and running lights may be controlled by a manually operated switch, whereby the running lights may be disconnected or connected in a selected grouping with other signal lights for signalling purposes.

A still further object is to provide a signalling device for motor vehicles having a control switch of improved construction facilitating the making and breaking of circuits through a plurality of lights arranged to be connected in various groupings and in which pilot lights are energized to indicate to the operator the signal displayed for any particular setting of the switch.

The invention possesses other objects, some of which with the foregoing will be set forth at length in the following description wherein is explained that form of the invention which has been selected for illustration in the drawings accompanying and forming a part of this specification. In said drawings, one form of the invention is shown, but it is to be understood that it is not limited to that form, since the invention as set forth in the claims may be embodied in a plurality of forms.

In the drawings:

Figure 1 is a front elevation of a signal housing constructed in accordance with my invention; parts being broken away.

Figure 2 is a side view partly in elevation and partly in section, the plane of the section being indicated by the line 2—2 of Figure 1;

Figure 3 is a sectional view of the signal housing, the plane of the section being indicated by the line 3—3 of Figure 1;

Figure 4:
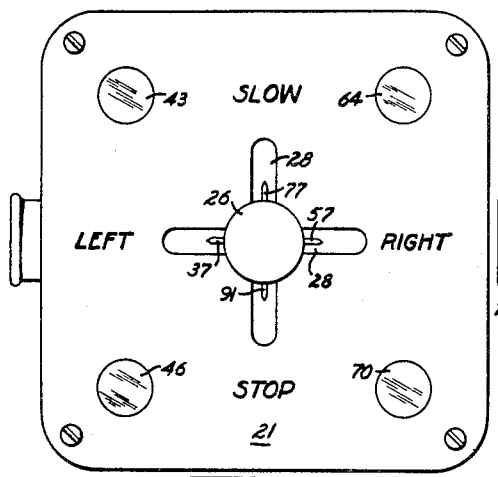
Figure 4 is a plan view of the control switch of my invention.
Figure 5:
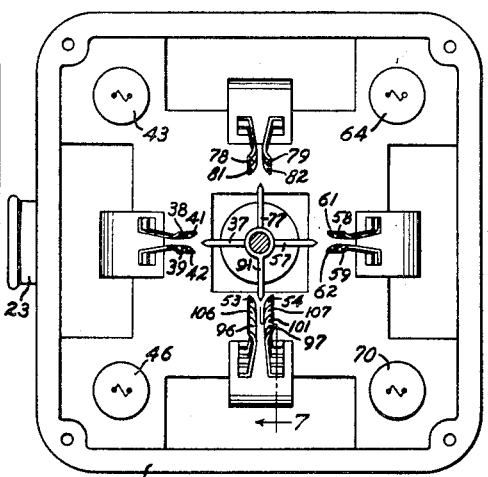
Figure 5 is a plan view of the control switch, with the cover removed; parts being broken away.
Figure 6:
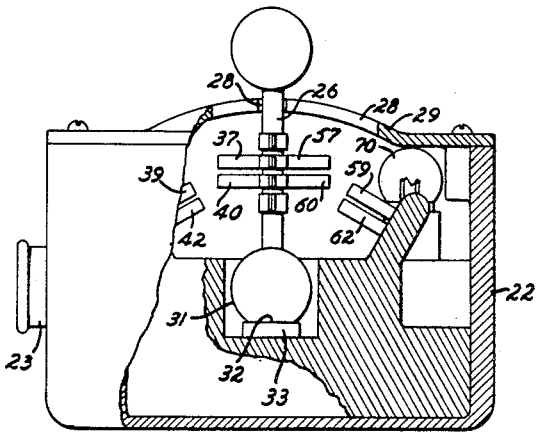
Figure 6 is a front elevational view of the control switch, parts being broken away and parts being shown in vertical section.
Figure 7:
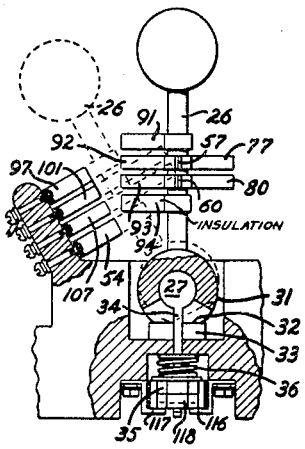
Figure 7 is a sectional detail illustrating the operation of the control switch arm.

In terms of broad inclusion, the direction indicator of my invention comprises sets of lights mounted at the front and rear of a motor vehicle, and a control switch for making and breaking an electric circuit through the various lights in selected groupings, by which a driver of the vehicle may signal an intended course of action to others ahead of or behind him. Each set comprises a reference light arranged to project a characteristic color, and a plurality of signal lights spaced horizontally and vertically around the reference light, and arranged to project light of different colors. The relative positioning and color of energized lights serve to signal various intended courses of action, as for example a turn to right or left, or an intention to slow down or stop. Preferably each set of lights includes a running light which is normally energized during night driving, the rear running light serving as the ordinary tail light, and the forward light, which may be blue or other permissible color, performing a similar function at the front of the vehicle. The signal control switch is preferably arranged to automatically break the circuit through the running lights, when moved to any signalling position. My invention also contemplates the provision of switch and housing structures especially suited to the selection and display of differently colored signal lights in predetermined relationship for signalling purposes.

In terms of greater detail, the signalling device of my invention comprises a plurality of electrically operated signal lights mounted in sets at the front and at the rear of a motor vehicle. Each set of lights is mounted within a housing 1, arranged to be mounted upon a motor vehicle, not illustrated, in any convenient manner; as for example by a bracket arm 2, of any suitable shape and construction.

Each housing comprises a central compartment 3, side signal light compartments 4 and 5 at the sides of the central compartment, and a signal light compartment 6, preferably below the central compartment. The compartments are separated by suitable partitions 7; and a transverse partition 8 provides a mounting panel for the lights. Preferably reflectors 9 are provided for projecting light beams from each light through suitable lens 10 covering the compartments in which the lighting elements are mounted. The partitions 7 and reflectors 9 are arranged to prevent commingling of the light beams from different lights within the housing. If desired, the reflectors may be utilized in part to define the light compartment, as illustrated in the central compartment structure shown in Figures 2 and 3 of the drawings. Preferably a separate lens 10 is mounted over each compartment to further aid in directing light rays from the several lighting elements into separately discernible beams.

Each set of signal lighting elements comprises a reference light 11 mounted at about the center of its housing 1, in the compartment 3. The lights for the front and rear housings 1 are designated 11F and 11R respectively. Signal lights 12F and 12R are mounted above or below the corresponding reference lights 11, preferably within the same compartment, as illustrated; or separated from the lights 11 by suitable partitions or separate reflectors, not illustrated, if desired. Turn indicating signal lights 14F, 14R, 15F and 15R are mounted at opposite sides of the corresponding reference lights 11, within the compartments 4 and 5 respectively. Lights 16F and 16R, preferably serving as running lights while the vehicle is being operated in a normal manner at night, are mounted in the compartments 6.

Figure 8:
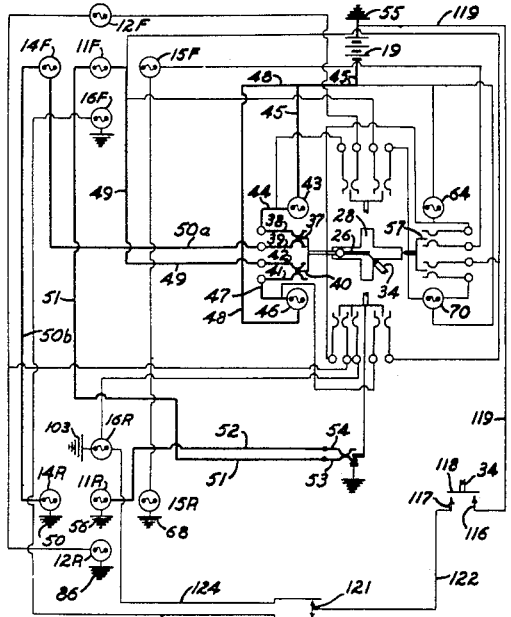
Figures 8, 9, 10 and 11 are wiring diagrams illustrating the manner in which the signal lights are energized in various groupings for signalling purposes.
Figure 9:
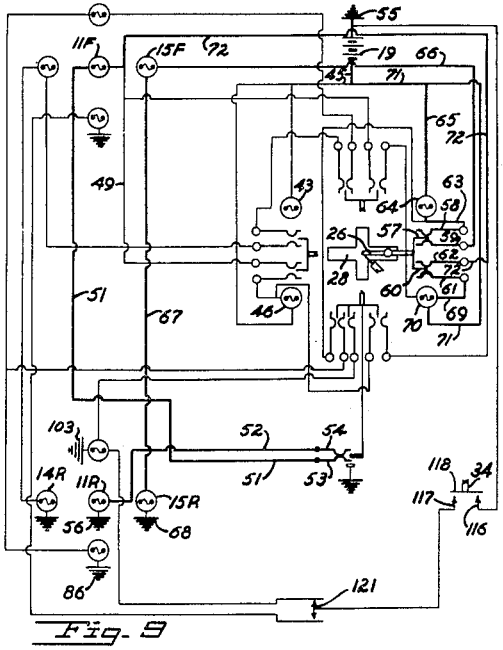
Figure 10:
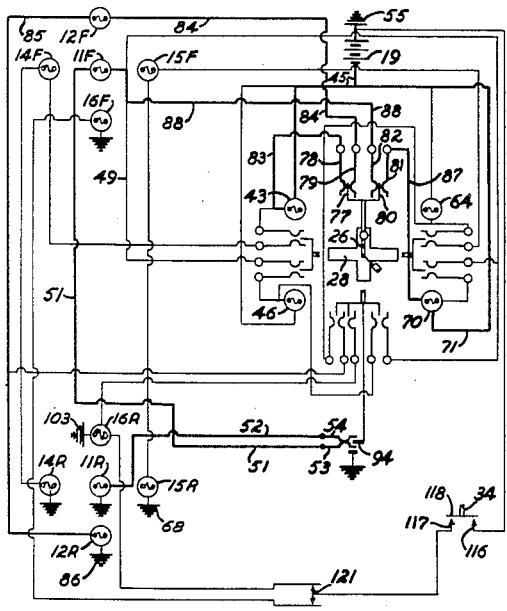
Figure 11:
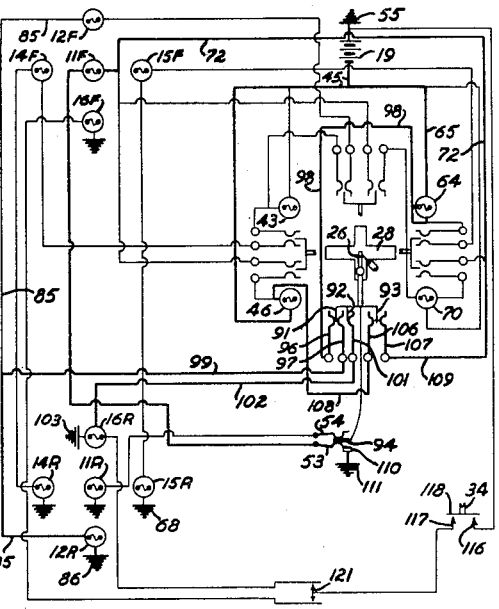

The several signal lighting elements are mounted by means of suitable sockets 18 secured to the partition 8 in any suitable manner. The lighting elements are separately connected to a source of electrical energy 19, as for example the storage battery of the vehicle, as indicated in general by the wiring diagrams Figures 8 to 11, inclusive.

The several lighting elements are controlled by a manual control switch designated in general by the numeral 21. The control switch preferably comprises a housing 22 mountable for convenient access by the driver of the vehicle, preferably upon the dash board of the vehicle, by any suitable mounting means such as a boss 23 engageable with a supporting bracket, not shown.

A central control arm 26 is mounted for pivotal movement by means of a ball and socket joint 27 permitting the arm to be moved to any selected signalling position along any branch of a pair of crossing slots 28 formed in a cover 29 fitted over the housing 22. The arm 26 normally extends outwardly through the housing at the intersection of the slots 28. The socket portion of the joint 27 has an approximately spherical outer surface 31 and a flat face 32 normally seating upon a fixed base 33 within the housing. The ball portion of the joint 27 is carried by a pin 34 extending through an opening in the base 33. A spring 36 interposed between the base 33 and a nut 35 threaded onto the lower end of the pin 34 holds the arm 26 in its neutral upright position with the flat face 32 seating upon the base 33. The spring 36 is arranged to be compressed sufficiently to permit the socket portion of the joint 27 to be turned to engage the base 3 as the arm 26 is swung to a signalling position. The central arm 26 is preferably made of insulating material, such as plastic or vulcanized rubber.

The switch arm 26 is provided with sets of circuit control blades corresponding to each of the signalling positions, the blades being movable into and out of engagement with corresponding pairs of contacts for making and breaking a circuit from the battery 19 to each of the several signal lights.

One such set of blades extends laterally from the arm 26 toward the left, and includes a blade 37, arranged to close an electrical connection between a pair of contacts 38 and 39, and a second blade 40 arranged to close an electrical connection between a pair of contacts 41 and 42. The contact 38 is connected to the battery 19 through a pilot light 43 mounted in the switch housing, by means of conductors 44 and 45. The lights 14F and 14R are connected in series between the contact 39 and a ground connection 50 by conductors 50a and 50b. The contact 41 is connected to the battery 19 through a pilot light 46 by conductors 47 and 48, the latter being connected to the battery through the conductor 45. The contact 42 is connected to the signal light 11F by a conductor 49. The light 11R is connected in series with the light 11F by conductors 51 and 52 which are normally connected through a pair of contacts 53 and 54. The circuit is completed through ground connections 55 and 56 for the battery and lights 11 respectively.

Another set of switch arm blades extends toward the right and includes a blade 57 arranged to engage a pair of contacts 58 and 59, and a blade 60 arranged to engage a pair of contacts 61 and 62. The contact 58 is connected by a conductor 63 to a pilot light 64 and thence to the battery 19 by a conductor 65, which in turn is connected to the conductor 45. The contact 59 is connected to the lighting elements 15F and 15R, which are connected in series through conductors 66 and 67 and a ground connection 68. The contact 61 is connected by a conductor 69 to a pilot light 70. A conductor 71 is connected from the light 70 to the battery connection 45. The contact 62 is connected by a conductor 72 to the conductor 49 leading from the contact 42 to the signal lights 11F and 11R, and serves to connect said lights in series through the conductors 49, 51 and 52.

A third set of switch arm blades extends forwardly from the switch arm 26 and includes a blade 77 arranged to engage a pair of contacts 78 and 79, and a blade 80 arranged to engage a pair of contacts 81 and 82. The contact 78 is connected to the battery through the pilot light 43 and its battery connections by means of a conductor 83. The contact 79 is connected to the signal light 12F by a conductor 84. The signal light 12R is connected in series with the light 12F by a conductor 85 and ground connection 86. The contact arm 81 is connected to the pilot light 70 by a conductor 87, and through said pilot light to the battery 19 by way of the conductors 71 and 45. The contact 82 is connected to the signal lights 11F and 11R by a conductor 88 which operated to direct current from the battery to the conductor 49 and thence through the signal lights and their several connections as above noted.

A fourth set of switch blades extends rearwardly from the switch arm 26 and includes blades 91, 92, 93 and 94. Blade 91 is arranged to engage and close a connection between a contact 96 and a contact 97. The contact 96 is connected to the pilot light 64 by means of a conductor 98 and through said pilot light to the battery 19 by way of the conductors 65 and 45. The contact 97 is connected to the signal light 12R by means of a conductor 99 connected to the conductor 85.

Blade 92 is arranged to engage and close a connection between contact 96 and contact 101. A conductor 102 connects the contact 101 to the running light 16R and through it to a ground connection 103.

Blade 93 is arranged to engage and close a connection between contacts 106 and 107. Contact 106 is connected to the battery 19 through the pilot light 46 by means of a conductor 108. A conductor 109 connects contact 107 with conductor 72 which in turn is connected to the conductor 49 through which the signal lights 11F and 11R are energized in series as above explained.

The blade 94 differs in structure and operation from the blades 91, 92 and 93 in that it is made of insulating material instead of conductive material, and also in that, instead of closing a circuit, it serves to break a normally closed connection between the contacts 53 and 54. As the blade 94 is moved between the contacts 53 and 54, the series connection of signal lights 11F and 11R is broken. At the same time, contact 53 is moved against a contact 110 which is provided with a ground connection 111. As a result a circuit will be closed through the signal light 11F, but signal light 11R will be cut out of the circuit and will remain unlighted when the arm 26 is moved rearwardly to signalling position.

In addition to the sets of control switch blades for making and breaking the circuits through the signal lights, the switch arm 26 is arranged to automatically make and break another circuit through each of the running lights 16F and 16R. This is accomplished by means of a pair of contacts 116 and 117, normally bridged by a conductor nut 118 threaded or otherwise secured to the lower end of the mounting pin 34. The contact 116 is connected to the battery 19 by a conductor 119. The contact 117 is connected to a main control switch 121 by a conductor 122. The switch 121 is arranged to separately make and break electrical connections to the running lights 16F and 16R through conductors 123 and 124 respectively. The switch 121 provides means for disconnecting the running lights during day driving and at other times when it is desired to dispense with their independent use.

While the switch arm 26 occupies its normal neutral position with the flat face 32 seating on the base 33, the spring 36 presses the nut 118 against the contacts 116 and 117, thereby closing a circuit directly from the battery to the switch 121 and thence to each of the running lights 16F and 16R. When the arm 26 is moved to any signalling position, the spherical portion of the joint portion at the base of the arm serves as a cam by which the pin 34 is moved outwardly against the pressure of the spring 36. The movement is sufficient to cause the nut 118 to disengage the contacts 116 and 117 and thereby break the circuit therethrough. This permits the lighting element 11 to be energized for signalling purposes independently of their function as running lights, and avoids the confusion which might result if they remained energized while a signal is being given.

The several signal lights are arranged to project beams of characteristic color suitable for signalling. Preferably the reference lights 11F and 11R project a green light beam. The rear signal lights 14R, 15R and 12R are preferably arranged to project a red beam, as is also the rear running light 16R. Since in many places it is unlawful to display a red light at the front of a vehicle, the front signal lights are of a suitable color which may be displayed, as for example yellow. The front running light is of a different permissible color, for example blue. The color may be produced by the use of colored light bulbs, or by the use of a colored lens.

In operation the arm 26 normally occupies a neutral position at the intersection of the slots 28, with the circuit to the running lights 16 closed through the contacts 116 and 117 by the nut 118. The light 16R will thus serve as the usual tail light for the vehicle, while the front light 16F will afford a warning to observers ahead of the vehicle.

When a turn is to be made toward the left, the switch arm is moved to the left along the left hand branch of the crossing slots 28. This movement breaks the connection to the running lights through the contacts 116 and 117, and causes the blade 37 to close a circuit through the contacts 38 and 39 and the blade 40 to close a circuit through the contacts 41 and 42. In this position the green reference lights 11F and 11R are energized and the signal lights 14F and 14R at the left of the reference are energized, thereby signalling the driver's intention to turn to the left. The green light informs observers both in front and in back of the vehicle that the right side of the vehicle will be clear, while the left side will be a danger zone. The energized circuits in this setting of the switch arm 26 are indicated in heavy lines in Figure 8. When the turn is completed, the arm 26 is returned to neutral position, thereby breaking the circuits to the signal lights and closing the circuit to the normal running lights. The pilot lights 43 and 46 being connected in series with the signal lights 14 and 11 respectively indicate to the operator the signal that is being given.

A turn to the right is signalled in a like manner by moving the arm 26 to the right. The blades 57 and 60 close circuits to the reference lights 11 and the right hand signal lights 15, as indicated in heavy lines in Figure 9.

To signal an intension to slow down, the arm 26 is moved forwardly to cause the blades 77 and 78 to close circuits through the reference lights 11 and the signal lights 12. In this position the display of a signal light immediately above or below a reference light will indicate to observers that progress is to be continued, but at a lessened speed. The energized circuits are indicated in heavy lines in Figure 10.

To signal an intention to stop, the switch arm 26 is moved rearwardly. In this setting the blade 91 closes a circuit through the contacts 96 and 97 to the rear signal light 12R, but the corresponding front signal light is not energized. At the same time, the blade 92 closes a connection between the contacts 96 and 101, thereby closing a circuit through the rear running light 16R which is grounded at 103. The blade 93 closes a circuit through the contacts 106 and 107 to energize the front reference light 11F only, the circuit to the rear reference light 11R being broken between the contacts 53 and 54 by the insulator blade 94. As the contact 53 is moved out of engagement with the contact 54, it is moved by the blade 94 into engagement with the grounded contact 110, thereby grounding the circuit through 11F while cutting out light 11R. In this position the display of the single green light at front indicates that traffic may pass in front of the vehicle; while the display of the two superposed signal lights 12R and 16R warn observers in back of the vehicle that a stop is to be made. The energized circuits for the stop setting of the arm 26 are indicated in heavy lines in Figure 11.

The pilot lights 43, 46, 64 and 70 are energized in series with the various groupings of the signal and reference lights. This enables the operator to see that the signal has been set in a desired position, and warns him to restore the arm 26 to its neutral position when the need for the signal has passed.

Perferably the signal lights 12, 14 and 15 are equipped with suitable flashers, whereby the signal will be made by a flashing light rather than a steady beam. The flashing light attracts attention to the signal; and the relationship of a flashing signal light to a fixed reference light with which it is associated affords a clear signal of an intended course of action which may be easily seen and understood by observers whose own course of action must be governed by the action of the signalling driver.

I claim:

1. In a direction indicator for motor vehicles, a control switch comprising a housing mountable upon the vehicle and provided with a cover having crossing guide slots, a switch arm pivoted within the housing and extending outwardly through the slots, the arm being movable along said slots to any of a plurality of signalling positions, a plurality of pairs of contacts mounted in alinement with each end of each slot, a like plurality of switch blades arranged in angularly spaced rows around the switch arm and alined with the corresponding pairs of contacts, the blades alined with each end portion of each slot being simultaneously movable into and out of engagement with pairs of contacts alined therewith to make and break separate circuits therethrough, an extension upon the arm, contacts normally engageable by said extension for closing a circuit when the switch arm is in non-signalling position, and means for automatically disengaging the extensions from the contacts when the arm is moved to signalling position.

2. A control switch for motor vehicle direction indicators having front and rear groups of lights each including a central reference light and a plurality of signal lights angularly spaced therearound, said switch comprising a pivoted switch arm selectively movable to any of a plurality of signalling positions, a plurality of groups of switch blades extending radially from the arm in angularly spaced relations, the blades of each group being spaced axially of the arm is insulated relation to each other and to the other groups, and circuit closing contacts independently engageable by the blades when moved to corresponding signalling positions for simultaneously energizing the front and rear reference lights and selected signal lights associated therewith in corresponding relation at both front and rear of the vehicle.

3. A control switch for motor vehicle direction indicators having front and rear groups of lights each including a central reference light and a plurality of signal lights angularly spaced therearound, said switch comprising a pivoted switch arm selectively movable from a neutral position to any of a plurality of signalling positions, a first set of electrical contacts including a contact positioned adjacent each signalling position of the arm and connected to the front and rear reference lights, a second set of electrical contacts spaced outwardly respectively from the corresponding contacts of the first set in insulated relation thereto and connected to signal lights in relationships corresponding to the various signalling positions of the switch arm, and a plurality of sets of axially spaced switch blades extending radially from the arm in angularly spaced relation corresponding to the signalling positions and engageable with selected first and second set contacts for simultaneously closing circuits through the front and rear reference lights and selected signal lights associated therewith in corresponding relation at both front and rear of the vehicle.

4. In a direction indicator for motor vehicles having signal lights positioned around reference lights at the front and rear of a vehicle, a switch comprising a switch arm selectively movable between a central normal position and inclined signalling positions angularly spaced around the normal position at intervals of about 90°, a pair of fixed contacts positioned in alignment with each signalling position in spaced and insulated relation to each other, pairs of circuit closing contacts mounted in insulated and axially spaced relation in planes substantially coinciding with the fixed contacts, each circuit closing contact being movable to engage a pair of fixed contacts for independently closing a circuit to a selected signalling light at front and rear of the vehicle, a third blade axially spaced from one of the pairs of circuit closing blades in insulated relation thereto and movable therewith to engage fixed contacts for closing a circuit to another signalling light at front and rear of the vehicle, a pair of contacts normally closing a circuit through the rear reference light, and a fourth blade aligned with and axially spaced from the third blade and the pair of circuit closing blades with which it is associated, said fourth blade being of insulating material and being movable to separate and break the circuit through contacts normally closing the circuit through the rear reference light.

5. A switch for direction indicators for motor vehicles as defined by claim 4, wherein the switch arm is provided with an enlarged pivot mounting portion having a flattened area upon which the portion normally seats, the flattened area being tilted when the arm is moved to a signalling position, and switch means normally closing a circuit through the front and rear running lights and movable by tilting the switch arm and flattened area to break said circuit.

References Cited in the file of this patent
UNITED STATES PATENTS

| | | |
|---|---|---|
| 1,426,193 | Holmgren | Aug. 15, 1922 |
| 1,717,629 | Sawyer | June 18, 1929 |
| 1,775,585 | Bobroff | Sept. 9, 1930 |
| 1,829,037 | Bobroff | Oct. 27, 1931 |
| 2,139,586 | Husemoller | Dec. 6, 1938 |
| 2,223,678 | Elliott | Dec. 3, 1940 |